(12) United States Patent
Mertz

(10) Patent No.: US 6,271,969 B1
(45) Date of Patent: Aug. 7, 2001

(54) FOLDED OPTICAL SYSTEM HAVING IMPROVED IMAGE ISOLATION

(75) Inventor: Pierre H. Mertz, Mountain View, CA (US)

(73) Assignee: Agilent Technolgoies, Inc., Palo Alto, CA (US)

( * ) Notice: Subject to any disclaimer, the term of this patent is extended or adjusted under 35 U.S.C. 154(b) by 0 days.

(21) Appl. No.: 09/209,572

(22) Filed: Dec. 11, 1998

(51) Int. Cl.[7] .................................................. G02B 27/10
(52) U.S. Cl. ....................... 359/618; 359/629; 359/630; 359/494
(58) Field of Search .................... 359/618, 629, 359/630, 631, 636, 494, 495, 497, 633

(56) References Cited

U.S. PATENT DOCUMENTS

| | | | |
|---|---|---|---|
| 4,653,875 | 3/1987 | Hines | 350/442 |
| 4,847,693 | * 7/1989 | Eppolito | 358/225 |
| 5,644,436 | 7/1997 | Togino et al. | 359/731 |
| 5,798,866 | * 8/1998 | De Vaan | 359/621 |
| 5,864,326 | * 1/1999 | Rallison | 345/7 |

FOREIGN PATENT DOCUMENTS

| | | | |
|---|---|---|---|
| 0 351 967 | 1/1990 | (EP) | G02B 27/00 |
| 0 718 645 | 6/1996 | (EP) | G02B 5/30 |
| 0 803 756 | 10/1997 | (EP) | G02B 27/01 |
| WO 97/10774 | 1/1997 | (WO) | G02B 1/10 |

\* cited by examiner

*Primary Examiner*—Georgia Epps
*Assistant Examiner*—Tim Thompson

(57) ABSTRACT

An optical collimating assembly for imaging light from a display. The optical assembly includes first and second linear polarization filters having polarization directions that are orthogonal to one another. A folded imaging assembly that includes a first beam splitter, a first ¼ wave plate, and a second beam splitter is located between the polarization filters. A second ¼ wave plate is also located between the polarization filters. The first ¼ wave plate has a birefringence axis that is orthogonal to the birefringence axis of the second ¼ wave plate. In the preferred embodiment of the present invention, the ¼ wave plates are constructed from the same birefringent material. One of the reflectors is preferably constructed from a material having a reflectivity that depends on the direction of linear polarization of light striking the beam splitter.

1 Claim, 3 Drawing Sheets

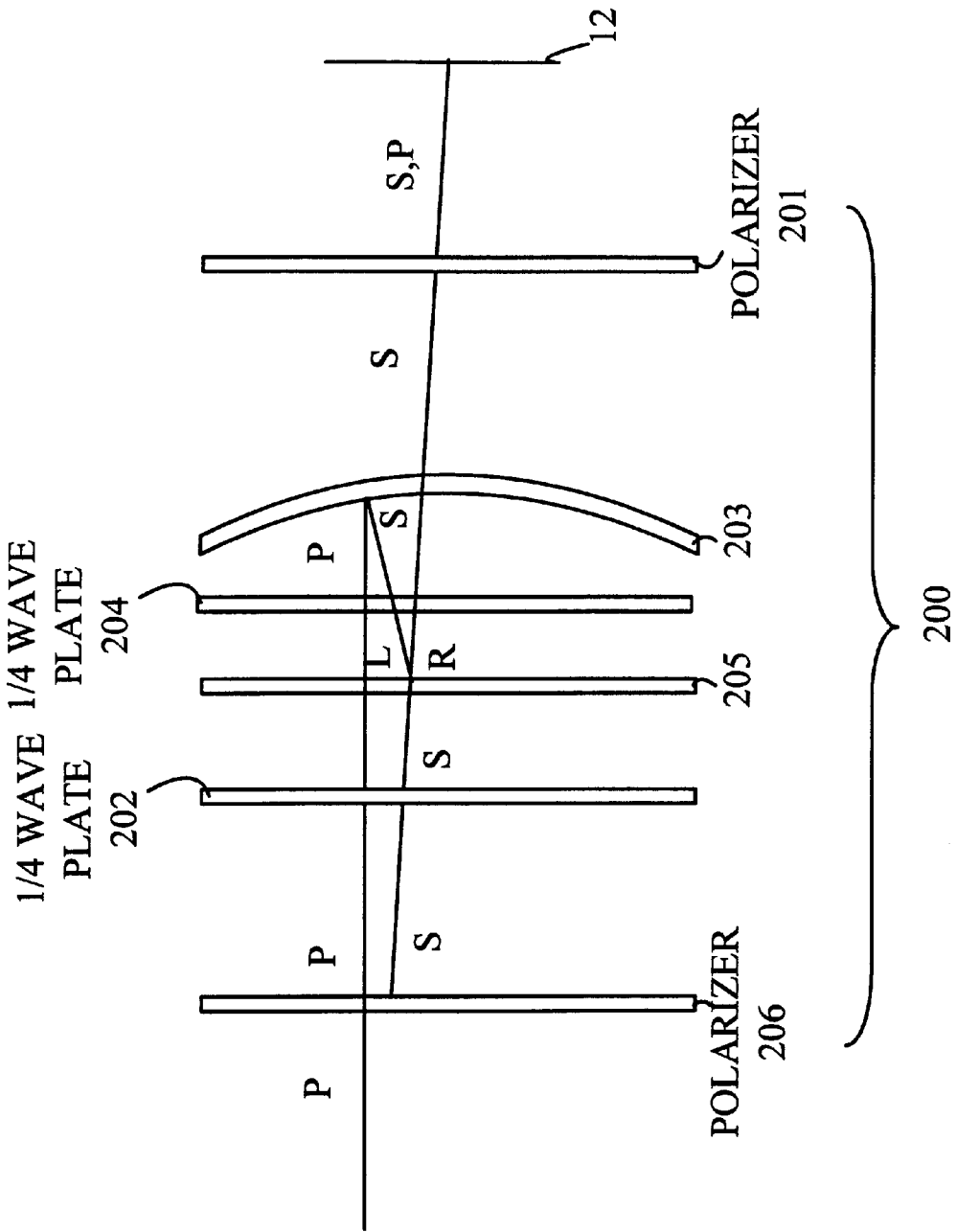

FOLDED OPTICAL SYSTEM HAVING IMPROVED IMAGE ISOLATION

FIELD OF THE INVENTION

The present invention relates to optical systems for viewing a display, and more particularly, to an optical system which utilizes a folded optical path to minimize the distance between the display and the viewer.

BACKGROUND OF THE INVENTION

To simplify the following discussion, the present invention will be discussed in terms of displays utilized in head mounted computer displays; however, it will be apparent to those skilled in the art from the following discussion that the present invention may be applied to other types of displays. Head-mounted computer displays may be viewed as "eye glasses" that are worn by the user to view images created by a computer or other image source. The image seen by each eye is generated on a display screen having a two dimensional array of pixels.

It is advantageous to minimize the distance between the display and the eye of the viewer to minimize the portion of the display that extends from the viewer's face. Large overhanging displays are uncomfortable to wear. In addition, optical systems based on reflectors are preferred since such systems provide high quality optical imaging at a cost that is much less than systems based on lenses.

Prior art systems that combine reflective optics with short display to eye distances are known to the art. These systems typically utilize partially reflecting optical surfaces to fold the optical path so that the distance from the viewer's eye to the display is minimized. Such a system is described in U.S. Pat. No. 5,644,436. For such systems to operate, the direct light emitted by the display must be blocked. Prior art systems typically utilize polarization filters and quarter wave plates to block the direct light from reaching the eye. Unfortunately, quarter wave plates only rotate the polarization vector of the light through precisely 90 degrees for specific wavelengths. Light having wavelengths that differ from the design wavelength is rotated either through slightly more than 90 degrees or slightly less than 90 degrees. Accordingly, these prior art systems do not block all of the light coming directly from the display and the viewer sees "ghost" images.

Broadly, it is the object of the present invention to provide an improved folded optical system based on reflective optical imaging elements.

It is a further object of the present invention to provide an optical system in which light from the display being imaged is blocked from reaching the viewer's eye independent of the wavelength of the light.

These and other objects of the present invention will become apparent to those skilled in the art from the following detailed description of the invention and the accompanying drawings.

SUMMARY OF THE INVENTION

The present invention is an optical collimating assembly for imaging light from a display. The optical assembly includes first and second linear polarization filters having polarization directions that are orthogonal to one another. A folded imaging assembly that includes a first beam splitter, a first ¼ wave plate, and a second beam splitter is located between the polarization filters. A second ¼ wave plate is also located between the polarization filters. The first ¼ wave plate has a birefringence axis that is orthogonal to the birefringence axis of the second ¼ wave plate. In the preferred embodiment of the present invention, the ¼ wave plates are constructed from the same birefringent material. One of the reflectors is preferably constructed from a material having a reflectivity that depends on the direction of linear polarization of light striking the beam splitter.

BRIEF DESCRIPTION OF THE DRAWINGS

FIG. 3 is a cross-sectional view of another embodiment of a folded optical imaging assembly according to the present invention.

DETAILED DESCRIPTION OF THE INVENTION

Figure 1:
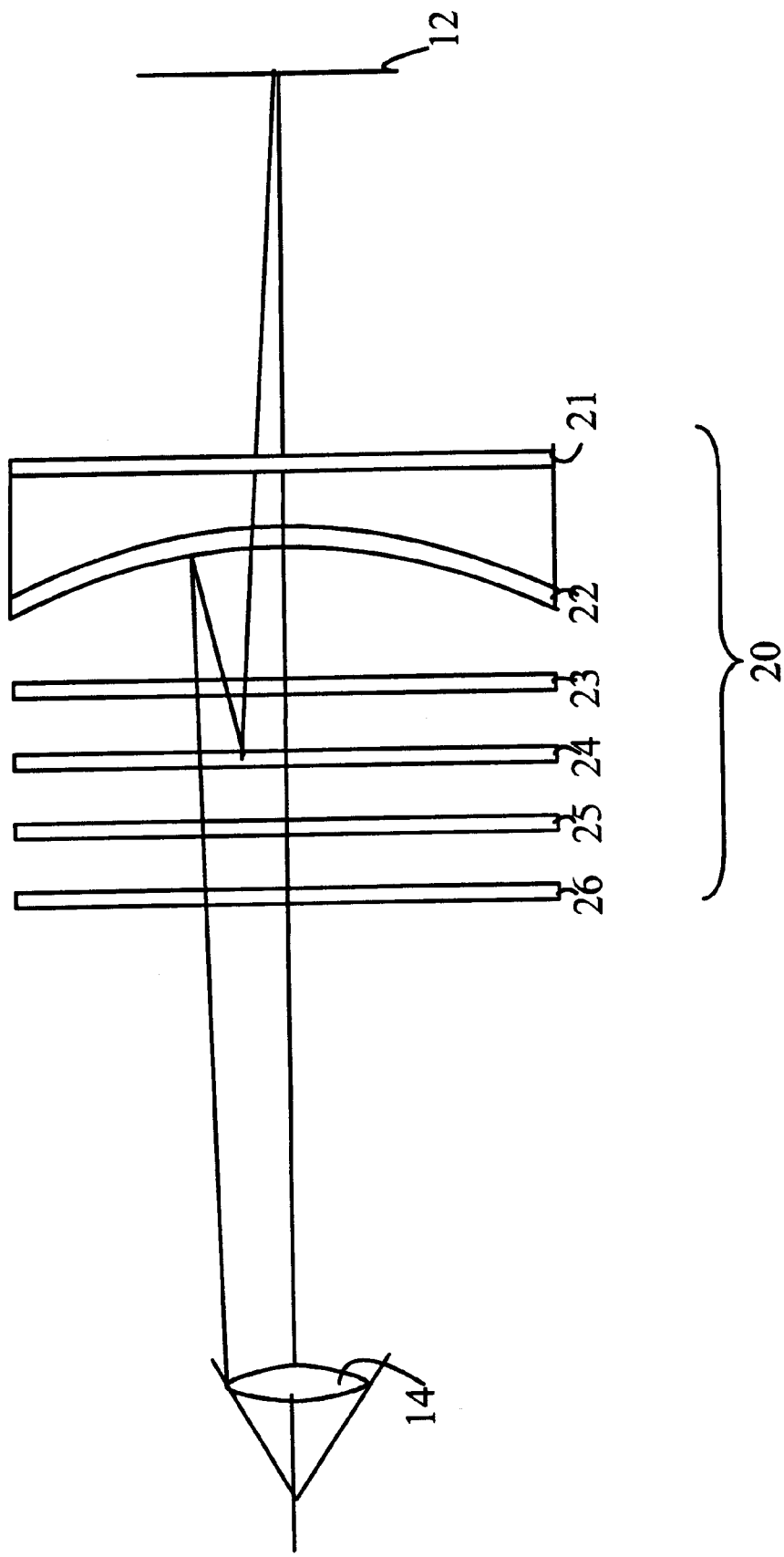
FIG. 1 is a cross-sectional view of a prior art folded optical imaging assembly.

The manner in which the present invention gains its advantages may be more easily understood with reference to FIG. 1 which is a block diagram of a typical prior art folded optical assembly 20. Optical assembly 20 images light from display 12 into the eye of a viewer 14 using a spherical beam splitter 22 as the imaging element. Ideally, light traveling directly from display 12 to viewer 14 is blocked. Optical assembly 20 utilizes parallel polarization filters 21 and 26 with a polarization rotation of 90 degrees between them to prevent light traveling directly from display 12 from reaching viewer 14. Optical assembly 20 includes the parallel polarization filters 21 and 26, two ¼ wave plates 23 and 25 and the beam splitter 24. The two ¼ wave plates, 23 and 25, are located between the polarization filters. The beam splitter 24 is located between the ¼ wave plates 23 and 25. The two ¼ wave plates 23 and 25 collectively act as a ½ wave plate that rotates the polarization of the light coming directly from polarizer 21 by 90 degrees so that this light is blocked by the polarizer 26. Thus, light traveling directly from display 12 is prevented from reaching viewer 14.

For optical assembly 20 to operate properly, the light that is collimated by spherical beam splitter 22 must not undergo the 90 degree rotation of its polarization as did the light coming directly from display 12 to viewer 14. Optical assembly 20 utilizes the observation that circularly polarized light changes its direction of polarization upon reflection. Light collimated by beam splitter 22 passes through ¼ wave plate 23 and leaves ¼ wave plate 23 circularly polarized. Assume the polarization of this light is right handed. The polarization of this light is then changed to left handed upon reflection from beam splitter 24. Upon passing again through ¼ wave plate 23, the light becomes linearly polarized, but the direction of polarization is rotated by 90 degrees relative to the direction of polarization imposed by the polarizer 21. When this light is reflected by spherical beam splitter 22, the direction of polarization is not changed. This light passes once more through ¼ wave plate 23, where its polarization is converted to left-handed circular polarization. Since the polarization of this light is left handed, unlike that of the light coming directly from display 12, which is right handed, ¼ wave plate 25 converts this light to linearly-polarized light. However, the direction of polarization of this linearly-polarized light has not undergone the 90 degree rotation undergone by the direction of polarization of the light coming directly from display 12. Hence, this light will pass through polarization filter 26.

The light passing directly from display 12 without reflection passes through both ¼ wave plates. If the ¼ wave plates behave in an ideal manner, they will act as a ½ wave plate and the direction of polarization of the light will rotate by 90°. A ¼ wave plate is a birefringent material where the thickness is chosen such that there is a phase retardation of π/2 between the fast and slow polarizations. If the light source's polarization axis is aligned to 45° between the slow and fast axis of the wave plate, left-hand circularly-polarized light emerges. If the angle is −45°, the output is right-hand circularly-polarized light. To simplify the following discussion, any axis that defines the orientation of the fast axis will be referred to as the "birefringence axis".

It should be noted that the thickness of the ¼ wave plate can only be chosen correctly for a particular wavelength in the optical portion of the spectrum. At other wavelengths, a small error occurs in the degree of retardation of the slow component. This error leads to a change in the polarization of the light passing directly from display 12 to viewer 14 between the polarization filters. Since the polarization filters only completely block light if there is an exact 90° rotation in polarization between them, a small fraction of the light leaving display 12 will reach the viewer. This results in the viewer seeing a ghost image that varies in intensity with color.

The present invention avoids the ghosting problems associated with prior art systems by utilizing an arrangement of ¼ wave plates in which the second ¼ wave plate reverses the action of the first ¼ wave plate. For example, if the first ¼ wave plate provides a retardation of π/2 between the two component polarizations of the light signal, then the second ¼ wave plate provides a retardation of −π/2 between the components. This is accomplished by aligning the ¼ wave plates such that the birefringence axis of the first ¼ wave plate is rotated by 90° relative to the birefringence axis of the second ¼ wave plate.

In the preferred embodiment of the present invention, the ¼ wave plates are constructed from the same material. Consider light of a wavelength that is different from the design wavelength, i.e., the wavelength for which the retardation is precisely π/2. If the first ¼ wave plate provides a retardation of less than π/2 than the second ¼ wave plate will also provide a canceling retardation of the same amount. Hence, the polarization of light passing through the two ¼ wave plates will remain unchanged independent of the actual retardation provided by the wave plates.

Figure 2:
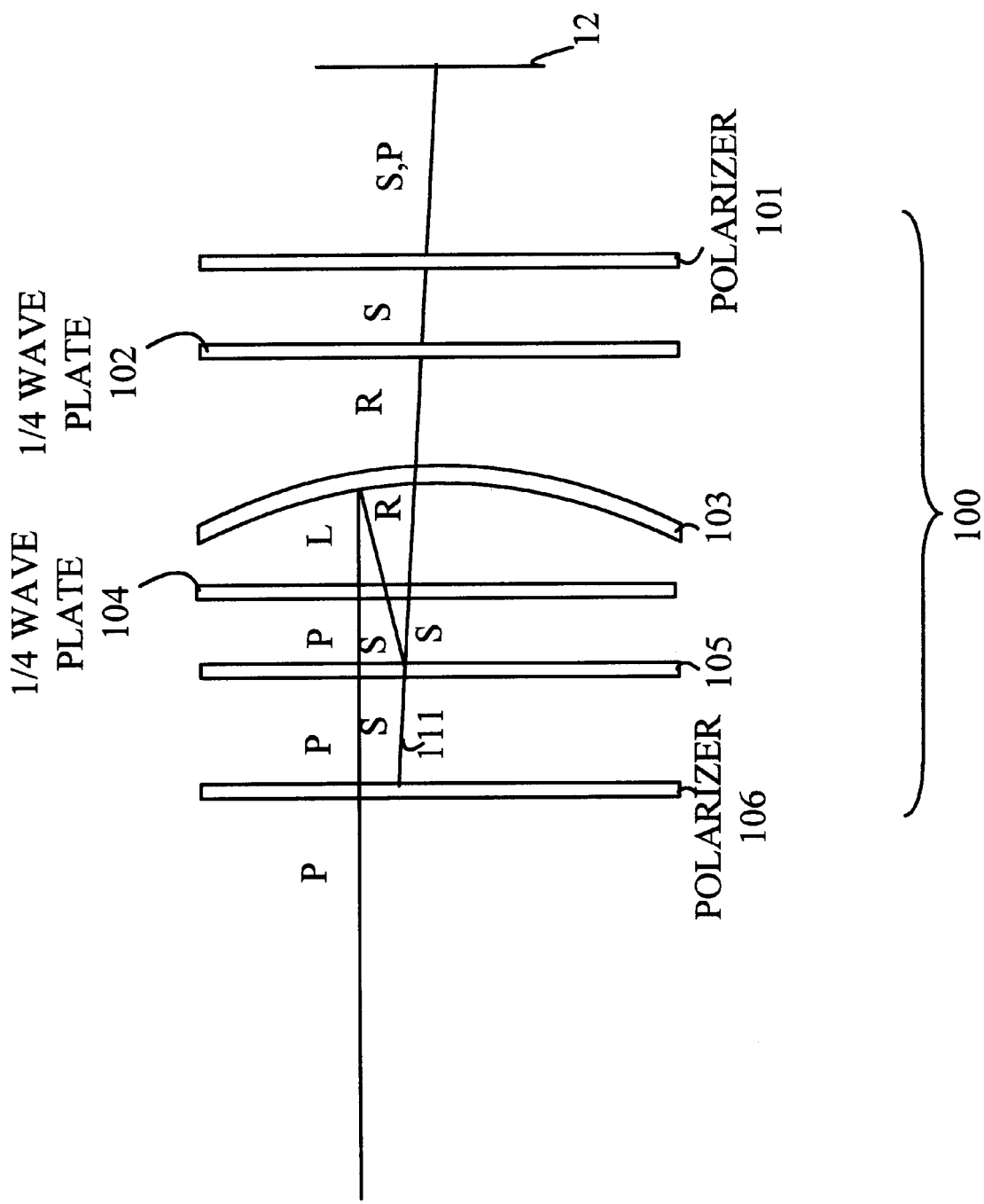
FIG. 2 is a cross-sectional view of one embodiment of a folded optical imaging assembly according to the present invention.

Refer now to FIG. 2, which is a cross-sectional view of a folded optical assembly 100 according to the present invention for collimating light from a display 12. For the purposes of this discussion, it will be assumed that the light leaving display 12 is unpolarized. Accordingly, the light leaving display 12 may be viewed as originating from two linear polarized sources, one generating light of a polarization denoted by "S" in the figure and one generating light of a polarization "P", where P is orthogonal to S. A first polarization filter 101 is set to remove the light of polarization P, leaving the light of polarization S. A first ¼ wave plate 102 converts this light into right-handed circularly polarized light, denote by "R" in the figure. This light passes through a spherical beam splitter 103 and a second ¼ wave plate 104. Wave plate 104 converts the right-handed circularly polarized light back to linear polarized light having a polarization in the S direction. This light strikes a planar beam splitter 105 which reflects a portion of the light back toward spherical beam splitter 103.

The remainder of the light 111 strikes polarization filter 106 which is set to block linearly polarized light having a polarization in the S direction. This is the light that comes directly from the display. As noted above, wave plate 104 is oriented such that it reverses the action of wave plate 102. Hence, all of the light from the display is blocked independent of the wavelength of the light.

The light that is reflected by beam splitter 105 passes back through ¼ wave plate 104 and is converted back to right-handed circularly polarized light. This light is reflected by spherical beam splitter 103. Upon reflection, circularly polarized light reverses polarization direction; hence, the light leaving spherical beam splitter 103 is left-handed circularly polarized light as indicated by the "L" in the figure. This light passes through ¼ wave plate 104 and is converted back to linearly polarized light. However, the direction of polarization is now P. The compound effect of the imperfect ¼ wave plates adds a little S polarization to this light, but this will only slightly decrease the throughput. Half of this light passes through beam splitter 105 and leaves the assembly via polarization filter 106, which is set to pass light having a polarization in the P direction.

The other half of the light is reflected again from reflector 103; however, this light will return with an S polarization, and hence, any light escaping the next reflection at beam splitter 105 will be blocked by filter 106. Accordingly, only the portion of the remaining light that undergoes two reflections from beam splitter 103 can escape. Each reflection from a beam splitter reduces the light intensity by a factor of two. In addition, the light reflected from spherical reflector 103 will no longer be collimated for viewing by the observer. Hence, the light that does not escape after the first reflection from reflector 103 is reduced in intensity by a factor of 16 and defocused. This background is sufficiently diffuse and reduced in intensity to be acceptable to a human viewer of display 12.

Refer now to FIG. 3 which is a cross-sectional view of another embodiment of a folded optical assembly according to the present invention. To simplify the following discussion, those elements of assembly 200 that serve the same function as elements shown in FIG. 2 have been given numerical designations that differ by 100 from those used in FIG. 2. Optical assembly 200 differs from optical assembly 100 shown in FIG. 2 in the placement of the ¼ wave plate that compensates for the action of the ¼ wave plate between the two beam splitters. In assembly 100 the compensating ¼ wave plate was located before the beam splitters, i.e., wave plate 102. In assembly 200, the compensating wave plate, ¼ wave plate 202, is located after the beam splitters. Once again, the ¼ wave plates are arranged such that the slow optical axes of the wave plates are orthogonal to one another.

The above described embodiments of the present invention utilize a spherical beam splitter and a planar beam splitter with a ¼ wave plate located therebetween. However, it will be obvious to those skilled in the art from the preceding discussion that any arrangement of two beam splitters that images the light from the display may be utilized. The preferred embodiment of the present invention utilizes a planar and a spherical beam splitter because of the ease with which these reflectors are generated.

The above-described embodiments of the present invention utilize partially reflecting surfaces to construct the beam splitters. If half-silvered surfaces are utilized, one half of the light is lost on each reflection. This leads to a substantial decrease in the brightness of the display. This light loss can be substantially reduced by utilizing a partially reflecting surface whose reflectance depends on the polarization of the light incident thereon. The imaging assembly of the present invention depends on a combination of two reflectors with a ¼ wave plate located between the two reflectors. One of the reflectors reflects circularly polarized light, and the other reflects linearly polarized light. For example, in optical assembly 100, reflector 105 reflects linearly polarized light, and reflector 103 reflects circularly polarized light. In optical assembly 200, reflector 205 reflects circularly polarized light, and reflector 203 reflects lineraly polarized light.

If the reflector that reflects linearly polarized light is constructed from a material that reflects light of one linear polarization and transmits light of the other linear polarization, a factor of 4 in the intensity of the light reaching the viewer is obtained. For example, in assembly 100, reflector 105 is constructed from a material that reflects light of one polarization while transmitting light of the orthogonal polarization. Such materials are known to the art. For example 3M markets such a material under the trade name DUAL BRIGHTNESS ENHANCEMENT FILM (DBEF). In the preferred embodiment of the present invention, reflector 105 is constructed such that S polarized light is reflected and P polarized light is transmitted. Hence, all of the light striking reflector 105 is reflected toward reflector 103. Half of the light striking reflector 103 is reflected back to the viewer. All of this light will reach the viewer, since all of the light reflected by reflector 103 will be P polarized when it reaches reflector 105.

The above-described embodiments of the present invention have utilized planar and spherical beam splitters. However, other geometries can be utilized without deviating from the teachings of the present invention. For example, both beam splitters can be curved and the curvature does not need to be spherical.

Various modifications to the present invention will become apparent to those skilled in the art from the foregoing description and accompanying drawings. Accordingly, the present invention is to be limited solely by the scope of the following claims.

What is claimed is:

1. An optical imaging assembly for imaging light from a display, said assembly comprising:
    a first linear polarization filter for passing light polarized in a first direction;
    a second linear polarization filter for passing light polarized in a second direction, said second direction being orthogonal to said first direction;
    a folded imaging assembly comprising a first beam splitter, a first ¼ wave plate, and a second beam splitter; and
    a second ¼ wave plate, wherein
        said folded imaging assembly and said second ¼ wave plate are located between said first and second linear polarization filters, and wherein said first ¼ wave plate has a birefringence axis that is orthogonal to the birefringence axis of said second ¼ wave plate, and wherein one of said first and second beam splitters comprises a material having a reflectivity that depends on the direction of linear polarization of light striking said beam splitter.

* * * * *